United States Patent [19]
Botros et al.

[11] Patent Number: 5,425,805
[45] Date of Patent: Jun. 20, 1995

[54] WATERFAST DYES FOR INK JET RECORDING FLUIDS

[75] Inventors: Raouf Botros; Sunita P. Chavan, both of Dayton, Ohio

[73] Assignee: Scitex Digital Printing, Inc., Dayton, Ohio

[21] Appl. No.: 204,479

[22] Filed: Mar. 2, 1994

[51] Int. Cl.⁶ .............................................. C09D 11/02
[52] U.S. Cl. ................................. 106/22 H; 106/20 D
[58] Field of Search ........................ 106/22 H, 20 D

[56] References Cited

U.S. PATENT DOCUMENTS

| | | | |
|---|---|---|---|
| 4,197,135 | 4/1980 | Bailey et al. | 106/22 H |
| 4,255,754 | 3/1981 | Crean et al. | 346/75 |
| 4,267,088 | 5/1981 | Kempf | 106/23 H |
| 4,299,630 | 11/1981 | Hwang | 106/22 H |
| 4,659,382 | 4/1987 | Kang | 106/22 H |
| 4,666,519 | 5/1987 | Akiyama et al. | 106/22 K |
| 4,698,123 | 10/1987 | Link et al. | 156/634 |
| 4,751,517 | 6/1988 | Crean et al. | 346/75 |
| 4,789,400 | 12/1988 | Solodar et al. | 106/22 H |
| 5,017,224 | 5/1991 | Tomita et al. | 106/22 H |
| 5,017,644 | 5/1991 | Fuller et al. | 106/22 H |
| 5,019,164 | 5/1991 | Tomita et al. | 106/22 H |
| 5,223,028 | 6/1993 | Aulick et al. | 106/22 H |
| 5,244,496 | 9/1993 | Easton et al. | 106/22 H |
| 5,281,264 | 1/1994 | Ono et al. | 106/22 K |
| 5,290,347 | 3/1994 | Ono et al. | 106/22 K |
| 5,334,435 | 8/1994 | Rossi et al. | 106/22 D |

*Primary Examiner*—Helene Klemanski
*Attorney, Agent, or Firm*—Barbara Joan Haushalter

[57] ABSTRACT

An ink jet ink composition comprises a liquid vehicle, a dye, and an N-hydroxyalkyl branched polyethyleneimine polymer or an N-hydroxyalkyl diphenylguanidine substituted at about 80% of the available nitrogens. The dye in this ink jet composition decreases the solubility of the ink and, therefore, can be used to formulate waterfast inks for ink jet printers.

26 Claims, No Drawings

WATERFAST DYES FOR INK JET RECORDING FLUIDS

TECHNICAL FIELD

The present invention relates to aqueous liquid inks which are waterfast when applied and, more particularly, to synthesis of waterfast dyes which can be used in formulating permanent ink jet recording liquids.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

In the ink jet printing art, water soluble dyes are desirable for runnability. However, waterfast inks are highly desirable for producing permanent images. Decreasing the solubility of the dye increases the waterfastness, and vice versa. One means for improving waterfastness is to use polymers and resins in inks to enhance adhesion of the dye to substrates. However, presence of resins in inks adversely affects machine runnability due to formation of deposits on orifice plates and charge plate buildup.

Ink jet ink compositions are known and generally contain water soluble dyes. In U.S. Pat. No. 5,017,644, ink jet ink compositions are disclosed which contain linear N-hydroxyethyl substituted polyethyleneimine polymers. Although the '644 patent disclosed some experiments using branched polymers, in addition to the experiments using linear polymers, the '644 patent actually teaches away from using branched polymers. In the '644 patent, the experiments using branched polymers gave results which were inferior to those using linear polymers. Unfortunately, linear polymers is not even commercially available, since the normal polymerization product of ethylenimine has random side branches which upon ethoxylation gives branched N-hydroxyethyl polyethyleneimine.

In U.S. Pat. No. 5,223,028, a hydroxyethylated polyethyleneimine (EPEI) is employed as one of four essential ingredients, Polyethyleneimines decrease the solubility of the dye. Polyethyleneimines degrade the dye, since they reduce the azo-linkage, which is the chemical group responsible for the color of the ink. The use of hydroxyethyl polymer increases the solubility of the dye, relative to the use of the unethoxylated polymer. This, unfortunately, decreases the waterfastness of the ink. Primary amines used in the inks can chemically interact, in an adverse manner, with the dye. Ethoxylation eliminates the presence of primary amino groups in the polymer, and the '028 patent requires ethoxylation of at least 95%. Unfortunately, when ethoxylation approaches 95%, the dye becomes more soluble, which can decrease the desired waterfastness of the ink. With the greater solubility, the '028 patent teaches lowering the pH by adding an ammonium salt. The salt is a required ingredient in the ink of the '028 patent. In addition, the invention of the '028 patent is no longer a pure compound. Reaching the required ethoxylation of at least 95% increases the potential of a side reaction between ethylene oxide and the hydroxyethyl chains of the polymer, forming polyglycol ether by-products. This would further increase the solubility of the dye, as previously mentioned.

It is seen then that there is a need for improved waterfast dye for use in ink jet recording equipment.

SUMMARY OF THE INVENTION

This need is met by the waterfast ink composition according to the present invention, which is comprised of a liquid vehicle, a dye, and a branched N-hydroxyalkyl polyethyleneimine polymer substituted at about 80% of the available nitrogens. Alternatively, the N-hydroxyalkyl polyethyleneimine polymer could be replaced with an N-hydroxyalkyl diphenylguanidine substituted at about 80% of the available nitrogens. Additionally, the polyethyleneimine polymer or diphenylguanidine could be epicholorohydrin modified (1-chloro 2,3 epoxypropane) to form the corresponding N-hydroxypropyl derivative. Acid and direct dyes are interacted with the hydroxyalkyl product to form the corresponding modified dyes. The dye in this ink jet composition has lower solubility than unmodified dye and, therefore, can be used to formulate waterfast inks for ink jet printers.

Other objects and advantages of the invention will be apparent from the following description and the appended claims.

DETAILED DESCRIPTION OF THE INVENTION

The ink jet ink composition of the present invention comprises a liquid vehicle, a dye, and an N-hydroxyalkyl imine substituted at about 80% of the available nitrogens. The N-hydroxyalkyl imine is preferably selected from the group consisting of branched polyethyleneimine polymer and diphenylguanidine. In accordance with an alternative embodiment of the invention, the branched polyethyleneimine polymer or diphenylguanidine could be epicholorohydrin modified (1-chloro 2,3 epoxypropane) to form the corresponding N-hydroxyalkyl derivative. The N-hydroxyalkyl is preferably selected from the group consisting of N-hydroxyethyl and N-hydroxypropyl. In a preferred embodiment, the polymer has a molecular weight range of approximately 40,000 to 60,000, and a preferred molecular weight of approximately 50,000.

The liquid vehicle in the ink jet ink composition of the present invention comprises an amine, preferably alkyl- and alkanol-substituted amines such as dimethylethanolamine, triethanolamine, diethylethanolamine and the like. Other additives that are optionally included in the vehicle of the invention include a corrosion inhibitor in an amount from 0 to 0.2 wt. % such as an alkanolamine; and a wetting agent of from 0 to 1 wt. %, such as an ethoxylated glycol ether; and a lower alphatic alcohol having one hydroxy group and up to five carbon atoms in a straight or branched chain in an amount of 0 to 10 wt. %; and a biocide from 0 to 0.5 wt. % such as dehydroacetic acid. The ink may also include an optional defoamer such as phosphate esters, silicone or non-silicone defoamer or acetylenic diol.

The dye in the ink jet ink composition of the present invention is water soluble and preferably selected from the group consisting of Direct Dyes, Acid Dyes and Food Dyes. In general, the concentration of the dye should be between about 2% and 4% by weight.

An ink made in accordance with the present invention may be manufactured as follows:

PREPARATION OF INK

EXAMPLE I

The following is one embodiment of an ink prepared in accordance with the present invention.

| Component | Weight % |
| --- | --- |
| Direct Black 19 dye | 3 |
| Triethanolamine | 1 |
| 80% Hydroxyethyl Polyethyleneimine M. wt. 50,000 | 3 |
| Surfynol 104 E Wetting Agent | 0.5 |
| 1,2-Benzisothiazoline-3-one biocide | 0.1 |
| Denatured alcohol | 5 |
| Deionized water | Balance |

When the ink composition was formulated as above in accordance with the present invention, the ink was used in a continuous ink jet printer, such as the type manufactured by Scitex Digital Printing, Inc., in Dayton, Ohio, to test its waterfastness. The prints generated using the ink formulated in accordance herewith retained nearly 100% of optical density, with no bleed after soaking in water for one minute.

EXAMPLE II

In a second embodiment of an ink prepared in accordance with the present invention, 1 wt. % of the polyethyleneimine polymer was substituted for the 3 wt. % in Example I:

| Component | Weight % |
| --- | --- |
| Direct Black 19 dye | 3 |
| Triethanolamine | 1 |
| 80% Hydroxyethyl Polyethyleneimine M. wt. 50,000 | 1 |
| Surfynol 104 E Wetting Agent | 0.5 |
| 1,2-Benzisothiazoline-3-one biocide | 0.1 |
| Denatured alcohol | 5 |
| Deionized water | Balance |

Even when only 1 wt. % of the polyethyleneimine polymer was used, in place of the 3 wt. %, the resulting print retained about 85% of the original optical density with only slight bleed.

EXAMPLE III

In a third embodiment of an ink prepared in accordance with the present invention, the polyethyleneimine polymer of Example I is replaced with an ethoxylated diphenylguanidine:

| Component | Weight % |
| --- | --- |
| Direct Black 19 dye | 3 |
| Triethanolamine | 1 |
| 82% 3,3-bis-hydroxyethyl-1,1-diphenylguanidine | 3 |
| Surfynol 104 E Wetting Agent | 0.5 |
| 1,2-Benzisothiazoline-3-one biocide | 0.1 |
| Denatured alcohol | 5 |
| Deionized water | Balance |

Prints generated using the ink formulated in accordance with Example III had ink retention varying between 80% and 90% of optical density.

As will be obvious to anyone skilled in the art, the ingredients in all three examples above are commercially available, except for the specific ingredient of 3,3-bis-hydroxyethyl-1,1-diphenylguanidine, although unethoxylated diphenylguanidine is commercially available. It is also understood and known in the art that waterfastness is dye specific, resulting in variations in the amount of waterfastness achieved. The ink composition of the present invention is particularly adaptable for incorporation into an ink jet printing apparatus for forming images by causing the ink to be expelled in droplets onto a substrate, thereby generating an image on the substrate.

In accordance with the present invention, when acid and direct dyes are interacted with the hydroxyalkyl product of diphenylguanidine, as illustrated in Example III above, the corresponding guanidinium salt of dyes is formed. A diphenylguanidine of 1,1-diphenylguanidine or 1,3-diphenylguanidine may be used to provide the desired hydroxyalkylated product. Of course, the reaction will be the same if branched polyethyleneimine polymer is used, as in Examples I and II above, instead of diphenylguanidine. It should be noted that diphenylguanidine is being used for purposes of discussion only, and is not to be considered as limiting the invention, as it has been repeatedly stated herein that the N-hydroxyalkyl imine is selected from the group consisting of branched polyethyleneimine polymer and diphenylguanidine. The modified dyes are used to formulate waterfast inks, in accordance with the present invention, particularly for use in ink-jet printers.

According to the invention, acid and direct dyes which carry —COOH or —SO3H groups are modified with hydroxyalkylated diphenylguanidine to form the guanidinium salt of the dyes. In addition to lowering the solubility of the modified dyes in water, the hydroxyethyl groups enhance the affinity of the dye to paper. The modified dyes will also have some solubility in alcohol which can allow addition of a small percentage of alcohol to aqueous inks to help improve drying time.

In formulating the dye of the present invention, diphenylguanidine reacts with two molecules of ethylene oxide to give the corresponding dihydroxyethyl derivative, or with two molecules of epicholorohydrin (1-chloro 2,3 epoxypropane) to give the corresponding dihydroxypropyl guanidine. These compounds react with a dye which has sulfonic and/or carboxylic groups to form the corresponding guanidinium salt. The guanidinium salt dye, then, is used to formulate waterfast ink jet ink.

In accordance with a preferred embodiment of the present invention, the modified dyes are formulated for use in ink jet printers. Acid and direct dyes are interacted with a hydroxyalkyl product of diphenylguanidine to produce hydroxyalkylated diphenylguanidine modified dyes. The acid and direct dyes may carry —COOH groups or —So3H groups. A corresponding guanidinium salt of dyes is formed from the interaction. The modified dyes are then used to formulate waterfast inks for ink-jet printers. The hydroxyalkyl diphenylguanidinium compounds lower the solubility of the modified dyes in water and the hydroxyalkyl groups enhance the affinity of dye to paper, making the modified dyes adaptable for use in ink jet printers.

Since the modified dyes may have some solubility in alcohol, a small percentage of alcohol can be added to aqueous inks to improve drying time.

In accordance with the present invention, an ink jet ink composition comprises a liquid vehicle, a dye, and a branched N-hydroxyalkyl polyethyleneimine polymer or N-hydroxyalkyl diphenylguanidine substituted at about 80% of the available nitrogens. The dye in this ink jet composition decreases the solubility of the ink and, therefore, can be used to formulate waterfast inks for ink jet printers.

INDUSTRIAL APPLICABILITY AND ADVANTAGES

The present invention is useful in the field of ink jet printing, and has the advantage of formulating a modified dye for use in ink jet printing ink which has decreased solubility and increased waterfastness.

The invention has been described in detail with particular reference to certain preferred embodiments thereof, but it will be understood that modifications and variations can be effected within the spirit and scope of the invention.

We claim:

1. An ink jet ink composition comprising a liquid vehicle, a dye, and an N-hydroxyalkyl imine substituted at about 80% of the available nitrogens, wherein the N-hydroxyalkyl imine substituted at about 80% of the available nitrogens is selected from the group consisting of branched polyethyleneimine polymer and diphenylguanidine and the branched polyethyleneimine polymer is epicholorohydrin modified.

2. An ink jet ink composition as claimed in claim 1 wherein the N-hydroxyalkyl imine substituted at about 80% of the available nitrogens consists of 3,3-bis-hydroxyethyl- 1,1-diphenylguanidine, substituted at 82% of the available nitrogens.

3. An ink jet ink composition as claimed in claim 1 wherein the N-hydroxyalkyl imine substituted at about 80% of the available nitrogens is present in an amount of from about 1 to about 3 percent by weight.

4. An ink jet ink composition as claimed in claim 1 wherein the dye is water soluble and selected from the group consisting of Direct Dyes, Acid Dyes and Food Dyes.

5. A process for generating images which comprises incorporating into an ink jet printing apparatus the ink composition of claim 1 and forming images by causing the ink to be expelled in droplets onto a substrate, thereby generating an image on the substrate.

6. A process as claimed in claim 5 wherein the ink contains an N-hydroxyalkyl imine substituted at about 80% of the available nitrogens selected from the group consisting of branched polyethyleneimine polymer and diphenylguanidine.

7. A process as claimed in claim 5 wherein the N-hydroxyalkyl imine substituted at about 80% of the available nitrogens consists of 3,3-bis-hydroxyethyl-1,1-diphenylguanidine, substituted at 82% of the available nitrogens.

8. A process as claimed in claim 5 wherein the N-hydroxyalkyl imine substituted at about 80% of the available nitrogens is present in an amount of from about 1 to about 3 percent by weight.

9. A process as claimed in claim 5 wherein the image is generated by a continuous stream ink jet printing process.

10. An ink jet composition as claimed in claim 1 wherein the liquid vehicle is selected from the group consisting of a wetting agent, a biocide, denatured alcohol, deionized water, and mixtures thereof.

11. An ink jet composition as claimed in claim 10 wherein the liquid vehicle is selected from the group consisting of a wetting agent, a biocide, denatured alcohol, deionized water, a corrosion inhibitor, a lower alphatic alcohol, and mixtures thereof.

12. An ink jet composition as claimed in claim 1 further comprising a defoamer.

13. An ink jet composition as claimed in claim 1 wherein the diphenylguanidine is epicholorohydrin modified.

14. A method for formulating modified dyes for ink jet printers, the method comprising the steps of:
   interacting acid and direct dyes with a hydroxyalkyl product of diphenylguanidine to produce hydroxyalkylated diphenylguanidine modified dyes;
   forming a corresponding guanidinium salt of dyes from the interaction;
   using the modified dyes to formulate waterfast inks for ink-jet printers, wherein diphenylguanidine reacts with two molecules of epicholorohydrin to form a corresponding dihydroxypropyl guanidine.

15. A method as claimed in claim 14 wherein the acid and direct dyes carry —COOH groups.

16. A method as claimed in claim 14 wherein the acid and direct dyes carry —SO3H groups.

17. A method as claimed in claim 14 wherein hydroxyalkyl diphenylguanidine derivatives groups lower the solubility of the modified dyes in water.

18. A method as claimed in claim 14 wherein the hydroxyalkyl groups enhance the affinity of dye to paper.

19. A method as claimed in claim 14 wherein the modified dyes have some solubility in alcohol.

20. A method as claimed in claim 14 further comprising the step of adding a small percentage of alcohol to aqueous inks to improve drying time.

21. A method as claimed in claim 14 wherein diphenylguanidine reacts with two molecules of ethylene oxide to form a corresponding dihydroxyethyl derivative.

22. A method as claimed in claim 21 wherein the derivative reacts with a dye which can have sulfonic and carboxylic groups to form a corresponding salt.

23. A method as claimed in claim 14 wherein the guanidine reacts with a dye which can have sulfonic and carboxylic groups to form a corresponding guanidinium salt.

24. A method as claimed in claim 14 wherein the guanidinium salt dye is used to formulate waterfast ink jet ink.

25. A method as claimed in claim 14 wherein the diphenylguanidine comprises 1,1-diphenylguanidine.

26. A method as claimed in claim 14 wherein the diphenylguanidine comprises 1,3-diphenylguanidine.

* * * * *